US007003310B1

(12) United States Patent
Youssefmir et al.

(10) Patent No.: US 7,003,310 B1
(45) Date of Patent: Feb. 21, 2006

(54) COUPLED UPLINK/DOWNLINK POWER CONTROL AND SPATIAL PROCESSING WITH ADAPTIVE ANTENNA ARRAYS

(75) Inventors: Mike Youssefmir, Portola Valley, CA (US); Mitchell D. Trott, Mountain View, CA (US)

(73) Assignee: ArrayComm LLC., San Jose, CA (US)

( * ) Notice: Subject to any disclaimer, the term of this patent is extended or adjusted under 35 U.S.C. 154(b) by 624 days.

(21) Appl. No.: 09/967,857

(22) Filed: Sep. 28, 2001

(51) Int. Cl.
H04Q 7/20 (2006.01)

(52) U.S. Cl. .................. 455/522; 455/101; 455/115.3; 455/115.1; 455/67.11; 455/67.13

(58) Field of Classification Search ............... 455/522, 455/13.4, 101, 134, 135, 115, 68, 69, 67.11, 455/67.13
See application file for complete search history.

(56) References Cited

U.S. PATENT DOCUMENTS

| | | | | |
|---|---|---|---|---|
| 4,559,520 | A | * | 12/1985 | Johnston ................ 340/310.02 |
| 5,241,690 | A | * | 8/1993 | Larsson et al. ............. 455/522 |
| 5,379,445 | A | * | 1/1995 | Arnstein et al. ........... 455/13.4 |
| 5,862,489 | A | * | 1/1999 | Aalto ........................ 455/522 |
| 6,047,189 | A | | 4/2000 | Yun et al. .................. 455/452 |
| 6,438,377 | B1 | * | 8/2002 | Savolainen ................ 455/439 |
| 6,463,295 | B1 | * | 10/2002 | Yun ........................... 455/522 |
| 6,593,880 | B1 | * | 7/2003 | Velazquez et al. .......... 342/367 |
| 6,597,678 | B1 | * | 7/2003 | Kuwahara et al. .......... 370/342 |
| 6,678,530 | B1 | * | 1/2004 | Hunzinger ................. 455/522 |
| 6,700,879 | B1 | * | 3/2004 | Taylor ....................... 370/332 |
| 2003/0153272 | A1 | * | 8/2003 | Takano ..................... 455/67.1 |

OTHER PUBLICATIONS

Article entitled Transmit Beamforming and Power Control for Cellular Wireless Systems by Farrokh Rashid-Farrokhi, K. J. Ray Liu, and Leandros Tassiulas; Oct., 1998; IEEE Journal on Selected Areas in Communications, vol. 16, No. 8.

Article entitled Joint Optimal Power Control and Beamforming in Wireless Networks Using Antenna Arrays by Farrokh Rashid-Farrokhi, Leandros Tassiulas, and K. J. Ray Liu; Oct. 1998; IEEE Transactions on Communications, vol. 46, No. 10.

* cited by examiner

*Primary Examiner*—Lester G. Kincaid
*Assistant Examiner*—Huy Phan
(74) *Attorney, Agent, or Firm*—Blakely Sokoloff Taylor & Zafman LLP

(57) ABSTRACT

A wireless communication system includes base stations with adaptive antenna arrays that communicate with remote communication devices. The base stations monitor the power of uplink signals received from user terminals, and generate a downlink array pattern that directs signals toward desired users and directs nulls toward undesired users. A base station will increase the strength of the downlink signals directed to a desired user from which it senses an increasing uplink signal power and will deepen the null directed to an undesired user from which it senses an increasing uplink signal power. The remote devices monitor the quality of downlink signals they receive and increase the power of the uplink signal they transmit in order to improve received downlink signal quality.

20 Claims, 6 Drawing Sheets

COUPLED UPLINK/DOWNLINK POWER CONTROL AND SPATIAL PROCESSING WITH ADAPTIVE ANTENNA ARRAYS

TECHNICAL FIELD

This application relates to the field of wireless communication systems, and more specifically, to a system and method for power control based on measurements of uplink and downlink signals.

BACKGROUND

Antenna arrays may be used in communications systems that transmit and/or receive radio frequency (RF) signals. Antenna arrays typically include a number of antennas that are spatially separated and may be employed in a number of different wireless applications including radio communications systems, cellular systems, television broadcasting, point to point systems, paging systems, medical applications or the like.

The use of antenna arrays in such systems often provide antenna performance improvements over the use of a single element antenna. These antenna performance improvements for received signals may include improved signal to noise ratio and interference rejection. Antenna performance improvements for transmitted signals may include improved directionality and hence less power towards other co-channel users, security, and reduced transmit power requirements. Antenna arrays may be used for signal reception only, for signal transmission, or for both signal reception and transmission.

A typical application of antenna array systems is in a wireless communication system. Examples include a cellular communication system and a wireless local loop system. Such wireless communications systems typically include one or more communications stations, generally called base stations, each communicating with its subscriber units, also called remote terminals, remote devices, and handsets. In cellular systems, the handset is typically remote, while in wireless local loop systems, the handset is typically in a fixed location.

The antenna array is typically at the base station, but may also be employed at a user terminal. Communication from the remote station to the base station is typically called the uplink and communication from the base station to the remote station is typically called the downlink. In time division duplex (TDD) systems, uplink and downlink communications with a particular remote terminal occur at the same frequency, but during different time slots. In frequency division duplex (FDD) systems, uplink and downlink communications with a particular remote terminal occur at different frequencies and may or may not occur at the same time.

Another factor that impacts wireless communication system performance is the presence of multiple remote terminals in the same environment utilizing the same frequency or channel at the same time. As the number of separate sources or remote terminals utilizing the same frequency increases, the amount of interference in the communications channel tends also to increase.

SUMMARY

In an embodiment, base stations communicate with remote communication devices in a wireless communication system. The base stations include adaptive antenna arrays. The adaptive antenna array increases the strength and precision of downlink signals directed to a desired user in response to an increase in transmitted power from that desired user. The adaptive antenna array deepens nulls directed to an undesired user in response to an increase in transmitted power from that undesired user. A remote communication device measures the signal quality of received downlink signals, and may autonomously increase the power of the uplink signals that it transmits if the received signal quality falls below a minimum or lower threshold and may decrease transmitter power if the received signal quality increases above a maximum or upper threshold.

A remote communication device may include signal quality measurements in a report and send that report to the base station with which the remote device is communicating. The base station may reply with a power control message, which commands the remote device to increase or decrease its transmitter power.

These and other features and advantages will be apparent upon reading the following detailed description and upon reference to the accompanying drawings and claims.

DETAILED DESCRIPTION

Figure 1:
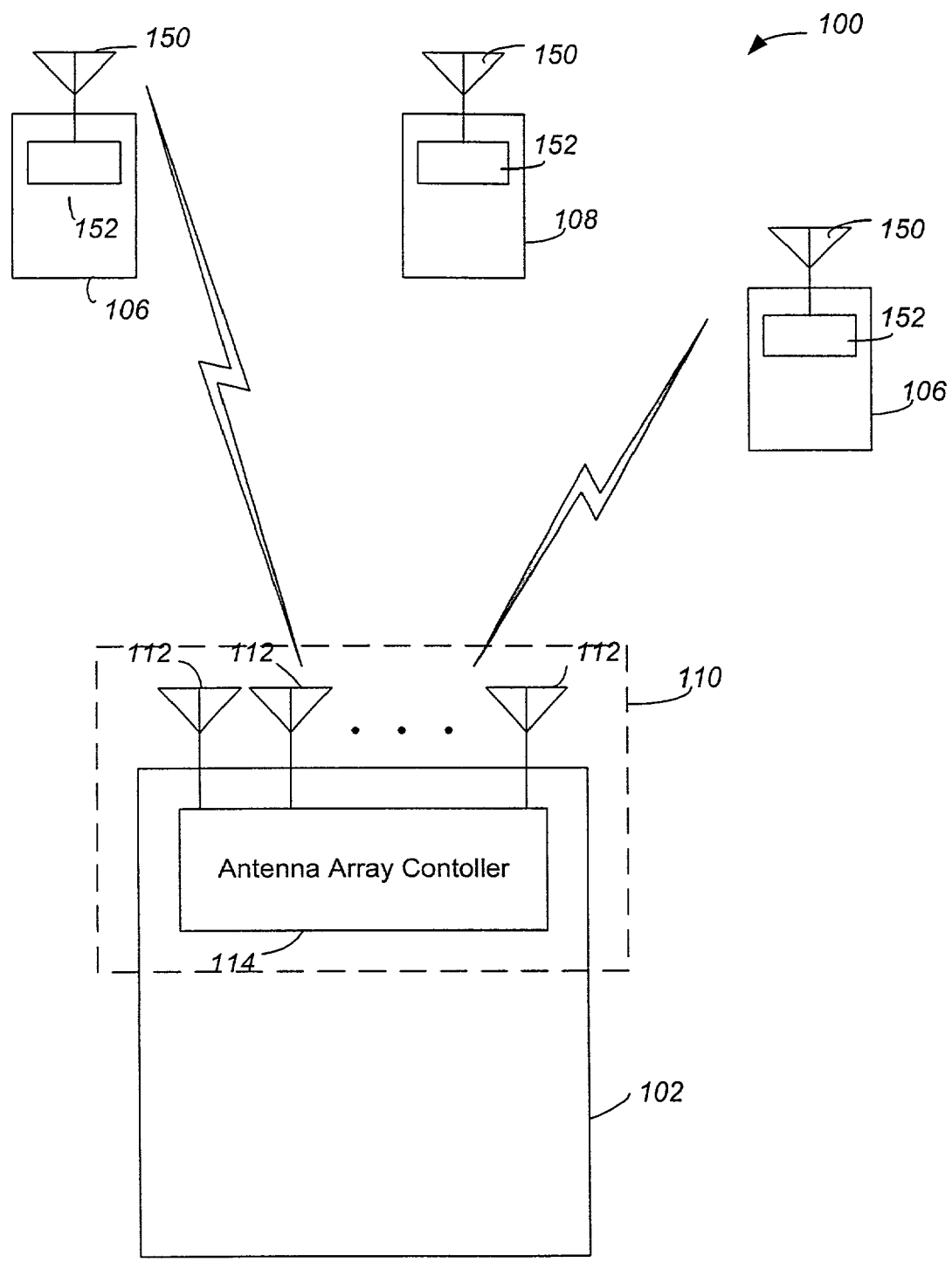
FIG. 1 is a block diagram of a base station and remote devices in a wireless communication system.
Figure 2:
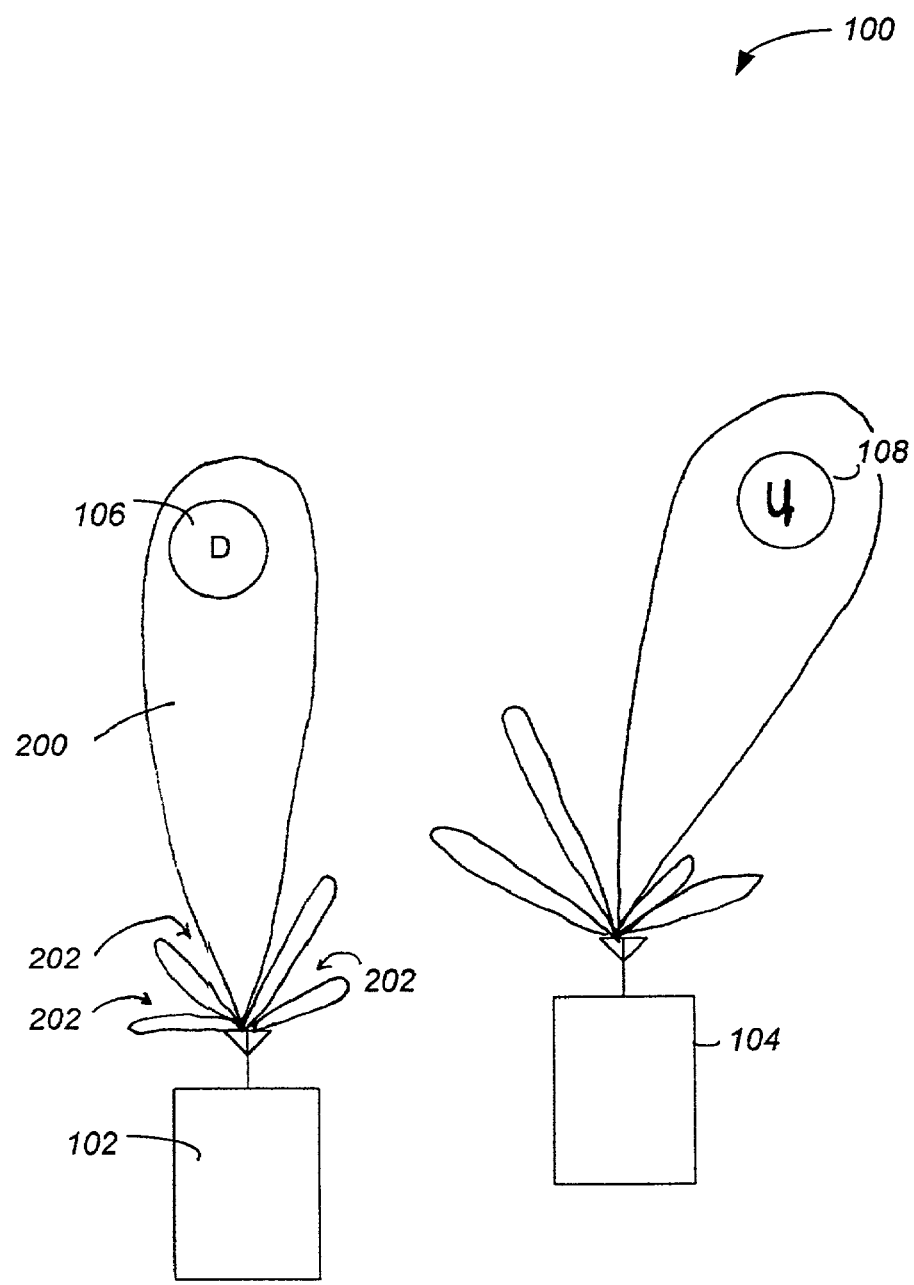
FIG. 2 is another block diagram of the wireless communication system of FIG. 1.

FIGS. 1 and 2 illustrate a wireless communication system 100 that includes two or more base stations 102, 104 and multiple remote communication devices 106, 108. The remote communication devices may be mobile devices, for example, cellular telephones, Personal Digital Assistants (PDAs), or other handheld units acting as transceivers. Each base station 102, 104 has an adaptive antenna array 110 that includes multiple antenna elements 112. An antenna array controller 114 adjusts the phase and amplitude of signals transmitted from, and received by, the antenna elements 112. All antenna elements may transmit and receive radio frequency (RF) signals. Alternatively, the adaptive antenna array may include separate transmit antenna elements and receive antenna elements. The number of transmit and receive elements need not be the same.

Figure 3:
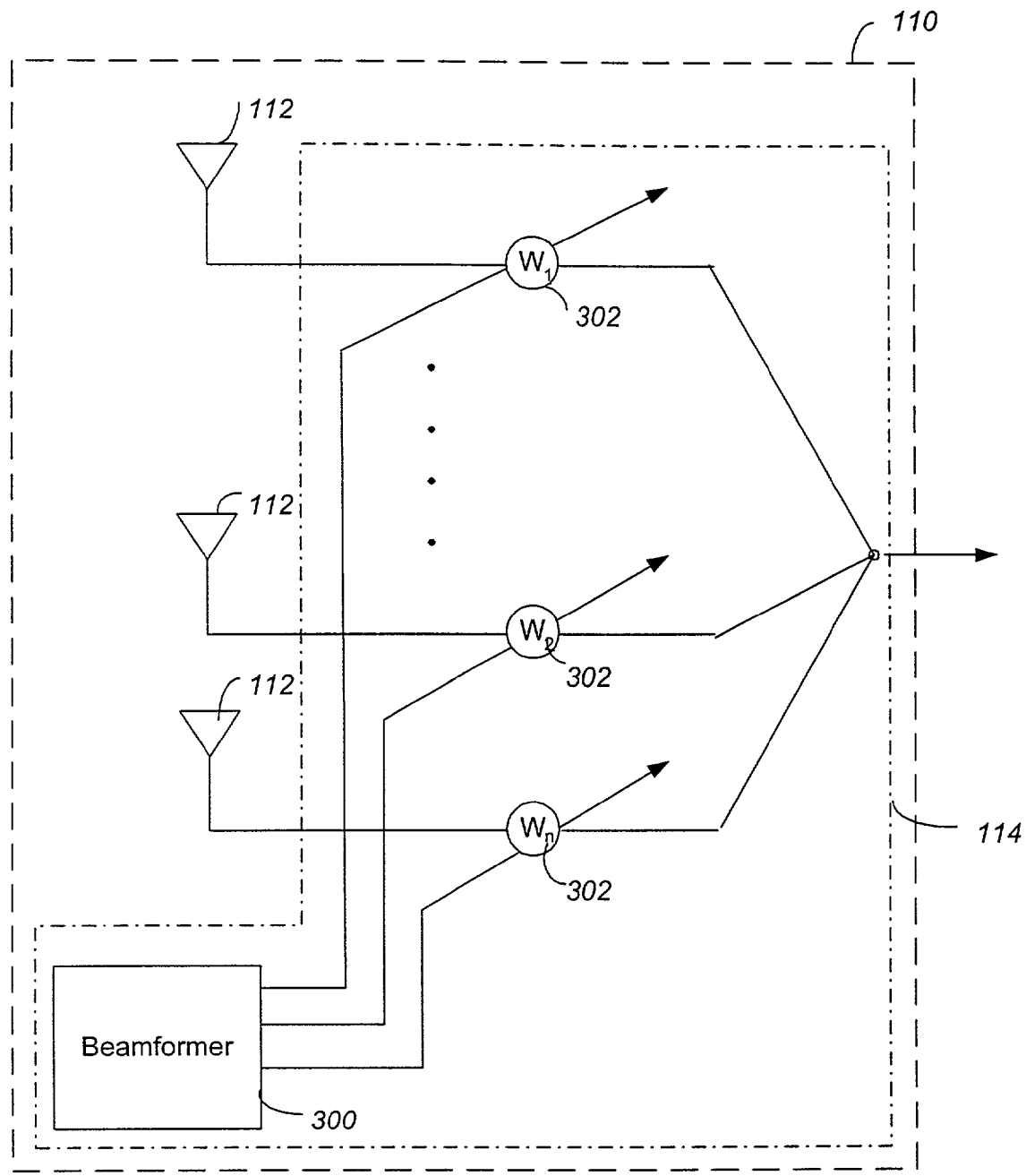
FIG. 3 is a block diagram of an adaptive array.

As shown in FIG. 3, the antenna array controller 114 may include a beamformer 300 that controls the amplitude and phase adjustment, or weight vector (W), applied to the transmitted and received signals using a filter 302 at each antenna element.

A base station may use the adaptive antenna array to create different transmit and receive patterns to selectively transmit power and reject interference in a real-time manner in response to a changing RF environment. The adaptive antenna array may use spatial processing techniques to process received signals and generate downlink array patterns. In an embodiment, the adaptive antenna array uses a linear spatial processing algorithm.

Figure 4:
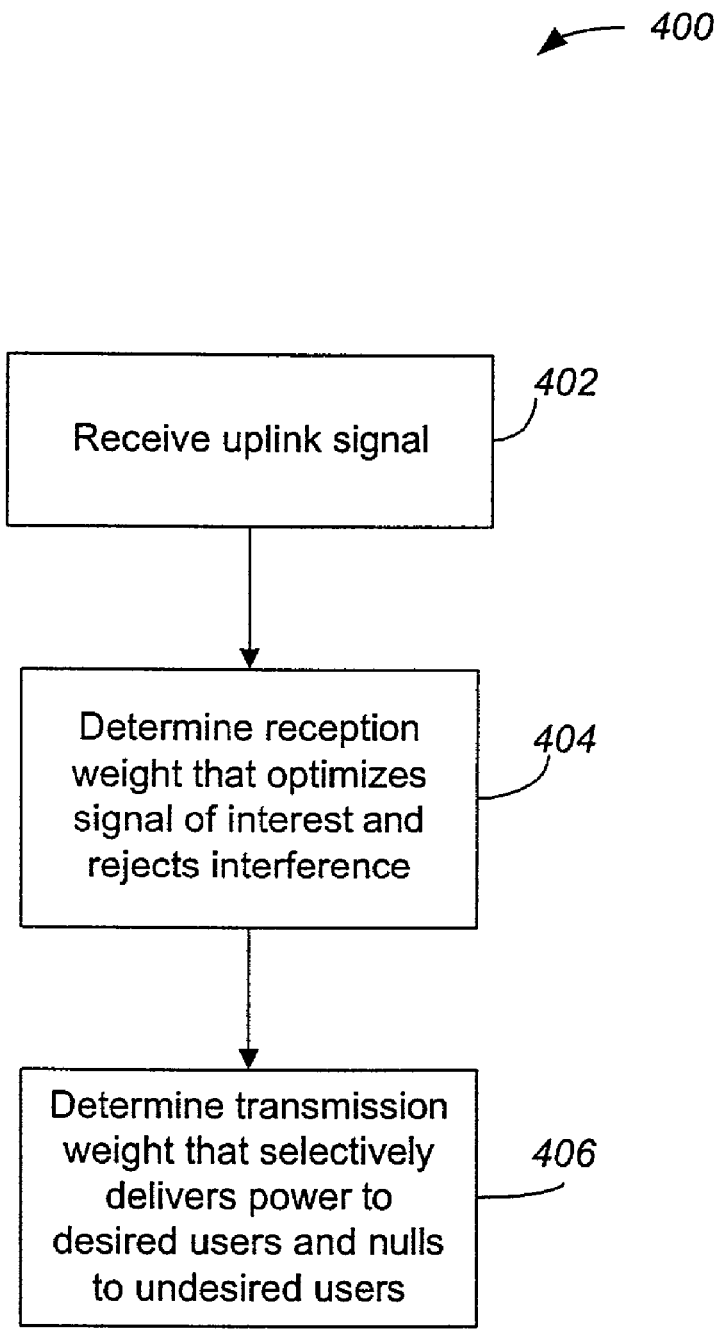
FIG. 4 is a flowchart describing an antenna array control operation at a base station.

FIG. 4 illustrates a flowchart describing a spatial processing operation 400 performed by the adaptive antenna array according to an embodiment. When a signal is sent from a remote unit to a base station (i.e., communication is in the uplink), the array of antenna elements introduce multiple versions of the signal, each of these versions comprising the composite of all the co-channel signals together with interference and noise (block 402). With multiple antennas, the relationship in both amplitude and phase of a signal of interest from a particular remote user to the interfering co-channel signals (i.e., signals from other remote users) will be different in each of the antenna signals due, for example, to geometric considerations, both because the antennas are separated by some distance, and, in some cases, because the different remote users also are separated.

The signals received at each element of the receiving array are each weighted, typically after downconversion (i.e., in baseband), in amplitude and phase by a receive weight (also called spatial demultiplexing weight) determined by the beamformer. All of the receive weights determine a complex valued receive weight vector which is dependent on the receive spatial signature of the remote user transmitting to the base station.

The remote device may transmit training data in the uplink signal that the beamformer is expecting and may use to train the demultiplexing weights for the signals. The beamformer may use an optimization method to determine the weights to apply to the modulated training data in the copies of the uplink signal that generate a copy signal which most closely approximates a reference signal. The optimizing method produces set of weights, or reception weight, that best amplifies the desired signal and rejects interference in the received uplink signal (block 404). The reception weight may be modified to account for array and electronic calibration factors and then used to generate a transmission weight. The transmission weight can be used to generate a downlink array pattern that selectively delivers power to the location of a desired user and minimizes power delivered (i.e., direct nulls) to sources of interference (e.g., undesired users).

The optimizing method may be a least squares technique that computes the uplink or downlink weights by solving the minimization problem:

$$w = \mathrm{argmin}_w \|w^H Z - s_1\|^2 = (R_{zz})^{-1} r_{zs} = (ZZ^H)^{-1} Z s_1^H,$$

where $R_{zz} = ZZ^H$ is the spatial (or spatio-temporal) covariance matrix of the antenna signals, $\|\ \|$ denotes the vector norm, and $rzs = Z s_1^H$ is the cross correlation between the antenna signals and the reference signal. The method uses the covariance Rzz of the input signal data as the characteristic feature for weight determining. Thus, calculation of the weights according to the equation requires having data corresponding to the signals received at the antenna elements and a reference signal. In practice, this typically entails identifying the training data and extracting it from a data burst, forming the covariance matrix for the received signals in the data burst, forming the cross correlation term, and solving for the weights.

Although one type of linear spatial processing operation has been described, other types of spatial processing, which may include linear and non-linear filtering, may be implemented in accordance with alternative embodiments of the invention.

By selectively weighting and adding signals transmitted from the different antenna elements to the remote device(s), the adaptive antenna array can shape the signals so that the signals are amplified, e.g., due to additive co-phase superposition, at the location of a desired user (D) and are minimized, e.g., due to destructive co-phase superposition, at the location of an undesired user (U). The classifications of "desired" and "undesired" users can change over time as communications links are initiated and terminated. Consider the case in which the remote device 106 has established a link with base station 102 and the remote device 108 has established a link with base station 104, as shown in FIG. 2. From the perspective of base station 102, remote device 106 is a desired user and remote device 108 is an undesired user, whereas base station 104 considers remote device 106 an undesired user and remote device 108 a desired user. These classifications would change, for example, if remote device 106 terminated its link with base station 102 and established a new link with base station 104.

This signal shaping capability enables the base station to generate a directed main beam 200 and adjustable nulls 202, as shown in FIG. 2. Similarly, by selectively weighting and adding signals received by the antenna elements 112, the adaptive antenna array 110 can amplify the signals transmitted by the desired users 106 and reject interference caused by signals transmitted by undesired users 108 or other interfering transmitter(s). In this manner, the beamformer can position nulls in the direction(s) of sources of interference during reception, and steer to the direction of the target signal by maintaining constant gain in the target signal direction.

FIG. 2 illustrates a representation of beams and nulls created by the adaptive antenna array that are reasonably accurate for a line-of-sight or nearly line-of-sight environments. This representation may not be accurate when there are RF reflectors or scatters in the environment, as is the case indoors or in dense urban environments. For these more difficult RF environments, downlink spatial processing creates a region (potentially very small in size, on the order of ½ a wavelength, e.g., 7 cm) of increased signal power at the location of the desired receivers 106 and a region of decreased signal power (a "null") at the location of receivers 108 that do not want to hear the signal. Hence, the spatial processing is location-based not direction-based.

The remote devices 106, 108 each includes an antenna 150 and an antenna controller 152. The antenna controller manages the transmission power of the antenna and measures the signal quality of the signals received by the antenna from the base station with which the remote unit is communicating. The signal quality may include several factors, including, but not limited to, the desired signal power, the interference signal power, the signal-to-interference ratio (SIR), bit error rate (BER), and frame error rate (FER). The SIR is the ratio of the received desired signal power to the received interference signal power. The interference signal may be produced by one or more co-channel interferers, such as other base stations and remote devices in the system, as well as non-system devices transmitting in the same frequency band.

To enable the two-way, simultaneous exchange of information between a base station and a remote device, some type of duplexing may be required. Many adaptive antenna array systems utilize time division duplexing (TDD) in which uplink signals (from remote unit to base station) and downlink signals (from base station to remote unit) may be transmitted in the same frequency, but during different times on a fixed interval, i.e., in different time slots.

The uplink signals received by the base station from a transmitter in the system, whether a desired user or an undesired user, has a spatial signature which may in part be characterized by the amplitude and the phase of the signal.

As described above, the downlink array pattern generated by the base station 102 may be determined by a characterization of the RF environment performed the uplink. In a TDD system, the base stations transmit and receive signals on the same frequency and typically not too far apart in time. In such a system, the spatial signature of the signals received at the adaptive antenna array from a transmitter is approximately the same for both the uplink and the downlink. Consequently, the transmission weight may be the same as the reception weight, after modification to account for array and electronic calibration factors, as described above.

Many factors can influence the array patterns generated by the base station depending on the specific algorithm employed. However, in general, as an undesired uplink signal gets stronger, the more aggressively the weights selected by the beamformer will configure themselves to reject that signal. Consequently, when transmitting to that undesired user in a subsequent time slot, the downlink array pattern is formed using the transmission weight such that the amount of power delivered to the undesired user also decreases. Similarly, as a desired uplink signal gets stronger, the beamformer will generate a reception weight that amplifies the desired signal and a transmission weight that causes the power directed to that desired user in the downlink array pattern to become stronger and less variable. In an embodiment, a remote device may take advantage of this response to control the strength of the signal delivered to it by a base station as either a desired or undesired user, and thereby control the quality of the signals it receives from the base station with which it is communicating.

Figure 5:
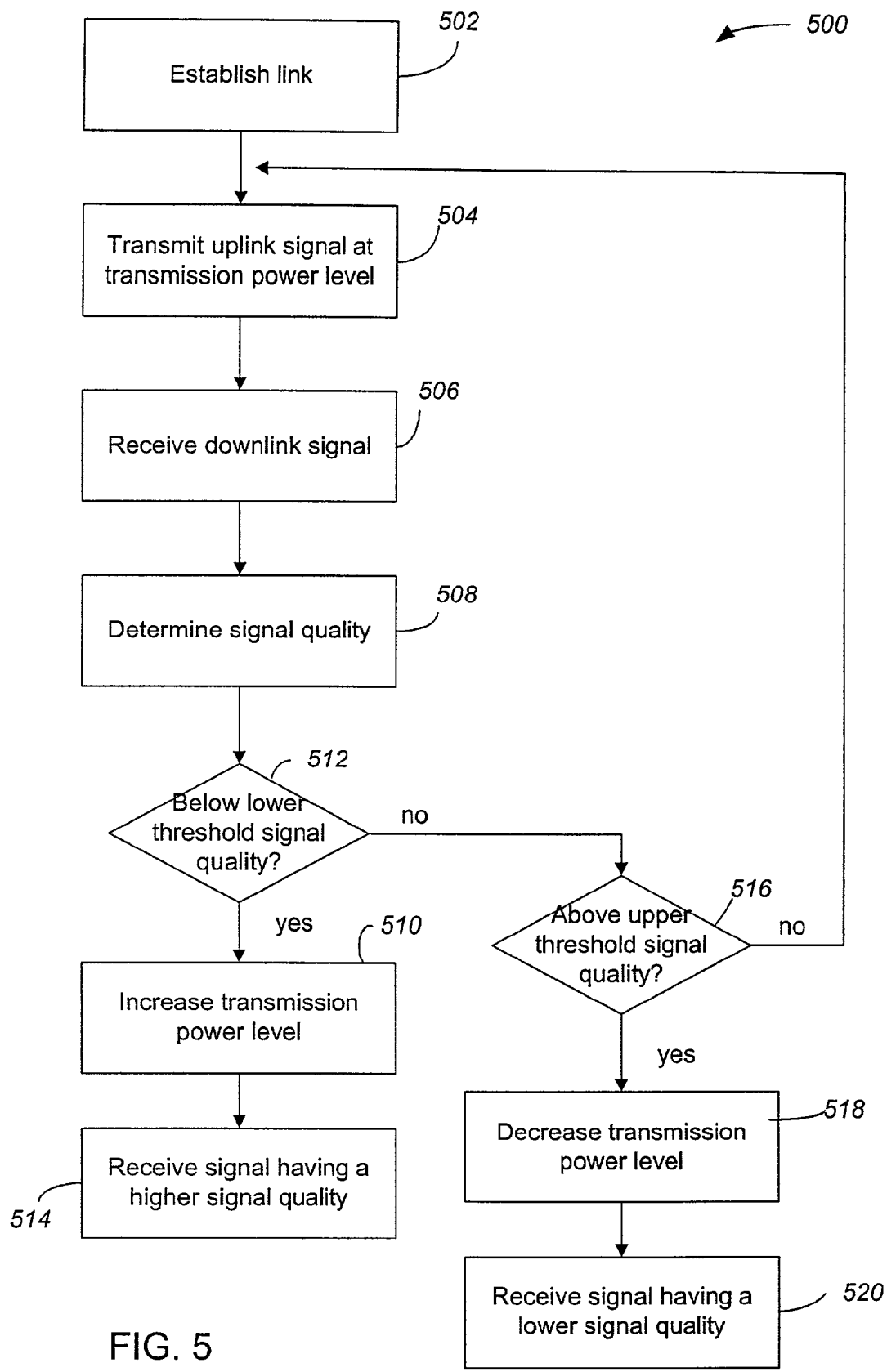
FIG. 5 is a flowchart describing an antenna control operation at a remote device.

FIG. 5 illustrates a flowchart describing an operation 500 for controlling transmitter power in the remote device. The remote device 106 establishes a wireless communication link with the base station 102, thereby establishing itself as a desired user (block 502). The remote device transmits an uplink signal to the base station at a given transmitter power level in a time slot (block 504) and receives a downlink signal from the base station in a subsequent time slot (block 506).

The antenna 150 may receive interfering signals along with the downlink signal. These interfering signals may be signals transmitted from co-channel interferers in the system, for example, the base station 104 and the remote device 108. Such interfering signals may affect the signal quality of the downlink signal received at the antenna. The antenna controller 152 determines the signal quality of the downlink signal (block 508). The antenna controller may measure instantaneous values or changes in the desired signal power and the interference signal power. From these measurements, the antenna controller can determine an instantaneous value of the SIR or a change in the SIR.

The remote device 106 may experience a degradation in signal quality due to a decrease in the strength of the desired signal and/or an increase in the strength of the interfering signal(s). As described above in connection with FIG. 4, the remote device can improve both factors of the SIR, i.e., desired signal power and the inverse of the interference power, by increasing its transmitter power. The base station for which the remote device is a desired user will increase the strength and precision of the signal delivered to that remote device in response to the base station experiencing an increased signal strength of the uplink signal, thereby increasing the desired signal power received by the base station's antenna. Also, the base station for which the remote device is an undesired user (interferer) will deepen the null, and decrease the variability of the null, delivered to the remote device in response to experiencing an increased signal strength from the remote device, thereby decreasing the interference signal power received by the base station's antenna.

The antenna controller 152 in the remote device may autonomously increase the transmitter power (block 510) if it is determined that a factor of the signal quality is below a certain minimum or lower threshold (block 512). Consequently, the base station will deliver, and the remote device will receive, a signal having an increased signal quality (block 514). The factor may be, for example, the desired signal power, SIR, the inverse of the interference signal power, FER, or BER.

Power control is an important consideration in wireless/handheld devices due to limitations in battery life. It may be desirable for the remote device to use the minimum transmitter power necessary to generate a useable uplink signal and maintain a useable downlink signal. The antenna controller may compare the measured signal quality to a maximum or upper threshold (block 516), and decrease the transmitted power in response to the signal quality being higher than necessary to adequately decode the downlink signal (block 518). Consequently, the base station will deliver, and the remote device will receive, a signal having a decreased signal quality (block 520). The power controller may constantly adjust the transmitter power to maintain the signal quality between the upper and lower thresholds, thereby providing power control while minimizing interference and maintaining the link with the base station.

Figure 6:
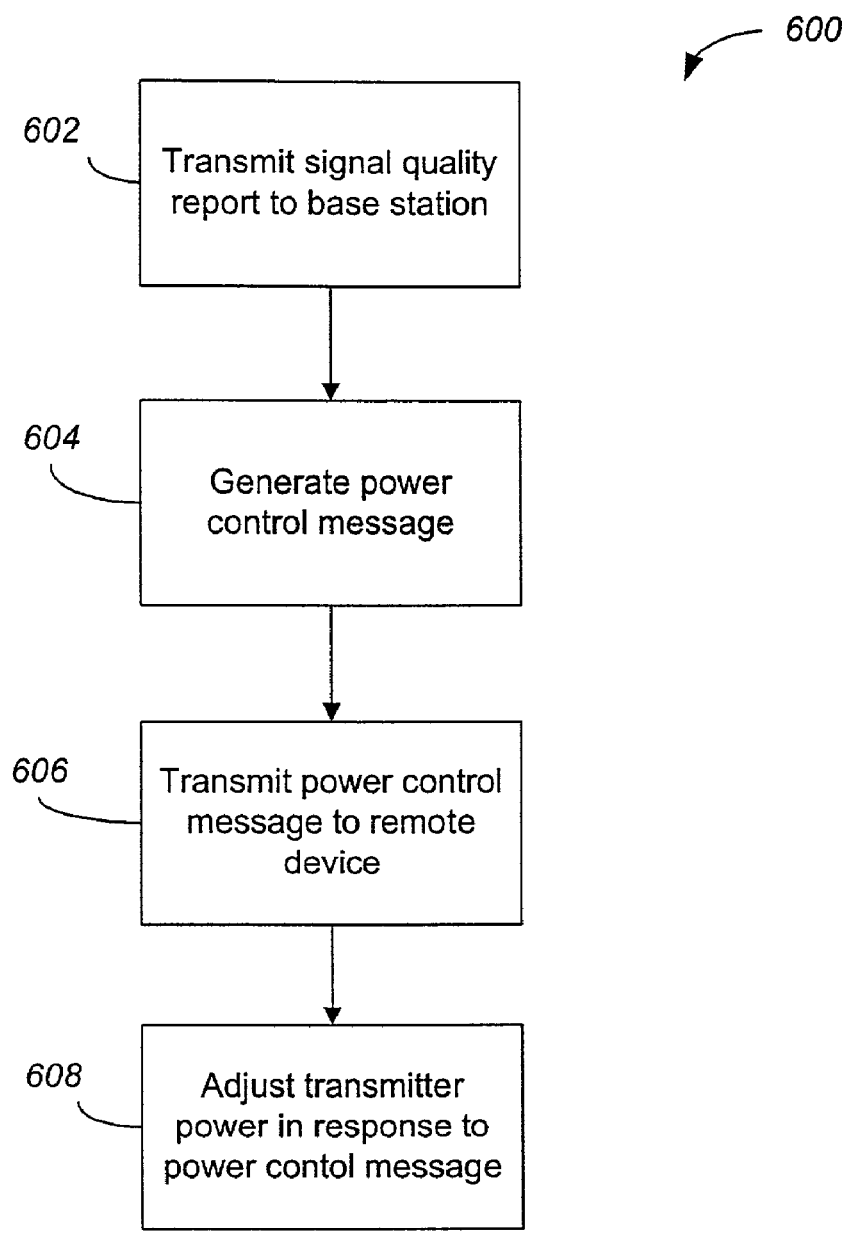
FIG. 6 is a flowchart describing a power control operation.

Alternatively, or in addition, the antenna controller 152 may transmit a signal quality report to the base station along with the uplink signal. FIG. 6 illustrates a flowchart that describes a power control operation 600 according to an embodiment. The signal quality report transmitted by the remote device may include one or more of the signal quality factors (block 602). The base station may then generate a power control message that indicates whether the remote unit should adjust its transmitter power based on the information in the signal quality report (block 604). The base station sends the power control message to the remote device with the downlink signal (block 606), and the antenna controller adjusts the transmitter power accordingly (block 608).

By utilizing the uplink/downlink power control and spatial processing techniques described above, the downlink grade of service to a user can be tuned on a per-user basis. No explicit communication is needed between base stations. The base station can trade off the power consumption of the user terminal against its downlink grade of service. The base station can also trade off the uplink interference caused by a user against its downlink grade of service.

A remote device can "save" a deteriorating downlink (that is, prevent it from completely failing) by increasing its uplink power. Rather than sending an uplink message containing a signal quality report or a power control command to the base station, which could be lost, or, due to processing and protocol delays, arrive too late to track fast changes, the remote device can actively improve the quality of the downlink signal it receives based on the known behavior of base stations in the system 100.

The power control and spatial processing techniques can be utilized in a frequency division duplexing (FDD) system. The adaptive array antenna uses a characteristic of the RF environment, e.g., angle of arrival, that is sufficiently preserved between the uplink and downlink frequencies and uses that characteristic to generate reception and transmission weights.

Various modifications and/or additions can be made to the techniques and systems described here. For example, blocks in the various flowcharts may be skipped or performed out of order and still produce desirable results. Accordingly, other embodiments are within the scope of the following claims.

Various implementations of the systems and techniques described here may be realized in digital electronic circuitry, integrated circuitry, specially designed ASICs (application specific integrated circuits) or in computer hardware, firmware, software, or combinations thereof.

What is claimed is:

1. A method in a communication station, comprising:
   receiving an uplink signal of a first transmission power level from a remote communication device;
   transmitting a downlink signal to the remote communication device with a signal having a signal quality;
   receiving an additional uplink signal of a second transmission power level from the remote communication device;
   determining that the second transmission power level differs from the first transmission power level;
   adjusting a transmission signal quality in response to determining that the second transmission power level of the remote communication device differs from the first transmission power level, including increasing the signal quality in response to determining that the second transmission power is higher than the first transmission power level; and
   transmitting an additional downlink signal to the remote communication device having the adjusted transmission signal quality.

2. A method according to claim 1 wherein adjusting the transmission signal quality in response to determining that the second transmission power differs from the first transmission power level comprises decreasing the signal quality in response to determining that the second transmission power is lower than the first transmission power level.

3. A method according to claim 1 wherein the remote communication device comprises an intended receiver, and further comprising deepening a null to a known interferer in response to the intended receiver increasing a transmission power of the additional uplink signal.

4. A method according to claim 1 wherein the remote communication device comprises an intended receiver, and further comprising decreasing a variability of a null to a known interferer in response to the intended receiver increasing a transmission power of the additional uplink signal.

5. A method according to claim 1 wherein adjusting the transmission signal quality comprises changing a variability of the additional downlink signal.

6. A method according to claim 1 wherein adjusting the transmission signal quality comprises changing an average power of the additional downlink signal.

7. A method according to claim 1 wherein adjusting the transmission signal quality comprises using different processing weights to result in a different radiation pattern for the additional downlink signal.

8. A communication station comprising:
   an adaptive antenna array to transmit downlink signals and receive uplink signals from a remote communication device; and
   an antenna controller coupled to the antenna array to determine if a received uplink signal differs in transmission power from a previously received uplink signal, and adjust a signal quality for a downlink signal to be transmitted from the antenna array, the signal quality adjustment in response to determining that the received downlink signal differs in signal quality from the previously received downlink signal, including increase the signal quality for the downlink signal in response to determining that the transmission power of the received uplink signal is higher than the transmission power of the previously received uplink signal.

9. A communication station according to claim 8 wherein the antenna controller to adjust the transmission signal quality in response to determining that the received uplink signal differs in from the previously received uplink signal comprises the antenna controller to decrease the signal quality for the downlink signal in response to determining that the transmission power of the received uplink signal is lower than the transmission power of the previously received uplink signal.

10. A communication station according to claim 8 wherein the remote communication device comprises an intended receiver, the antenna controller to further deepen a null to a known interferer in response to determining that the transmission power of the received uplink signal is higher than the transmission power of the previously received uplink signal.

11. A communication station according to claim 8 wherein the remote communication device comprises an intended receiver, the antenna controller to further decrease a variability of a null to a known interferer in response to determining that the transmission power of the received uplink signal is higher than the transmission power of the previously received uplink signal.

12. A communication station according to claim 8 wherein the antenna controller to adjust the signal quality for the downlink signal comprises the antenna controller to change a variability of the downlink signal to be transmitted.

13. A communication station according to claim 8 wherein the antenna controller to adjust the signal quality for the downlink signal comprises the antenna controller to change an average power of the downlink signal to be transmitted.

14. A communication station according to claim 8 wherein the antenna controller to adjust the signal quality for the downlink signal comprises the antenna controller to use different processing weights to result in a different radiation pattern for the downlink signal to be transmitted.

15. A method for wireless communication between a communication station and a remote communication device, comprising:
   receiving a downlink signal at the remote communication device from the communication station and measuring a signal quality of the received downlink signal;
   determining that the signal quality of the received downlink signal differs from a signal quality of a previous downlink signal;
   autonomously setting a second uplink transmission power level at the remote communication device, different from a first uplink transmission power level, in response to the measured signal quality of the previous downlink signal differing from the received downlink signal, the second uplink transmission power level higher than the first uplink transmission power level if the signal quality of the received downlink signal is lower than the signal quality of the previous downlink signal, and lower than the first uplink transmission power level if the signal quality of the received downlink signal is higher than the signal quality of the previous downlink signal; and transmitting an uplink signal to the communication station at the second uplink transmission power level to cause an autonomous adjustment of a downlink signal pattern at the communication station, the adjustment to increase downlink signal precision toward the remote communication device if the second uplink transmission power level is higher than the first uplink transmission power level, and decrease downlink signal precision toward the remote communication device if the second uplink transmission power level is lower than the first uplink transmission power level.

16. A method according to claim 15 wherein to increase downlink signal precision toward the remote communication device comprises increasing downlink transmission power.

17. A method according to claim 15 wherein to increase downlink signal precision toward the remote communication device comprises deepening nulls toward interferers.

18. A method according to claim 15 wherein to increase downlink signal precision toward the remote communication device comprises decreasing signal variability.

19. A method according to claim 15 wherein to decrease downlink signal precision toward the remote communication device comprises decreasing downlink transmission power.

20. A method according to claim 15 wherein to decrease downlink signal precision toward the remote communication device comprises increasing signal variability.

* * * * *